Jan. 5, 1965     C. E. SCOTT     3,164,211

MACHINE FOR FORMING SOD ROLLS

Filed June 6, 1962     10 Sheets-Sheet 1

Inventor:
Chester Emerson Scott
By: Hofgren, Brady, Wegner,
Allen & Stillman
Attorneys Jan. 5, 1965

C. E. SCOTT 3,164,211

MACHINE FOR FORMING SOD ROLLS

Filed June 6, 1962

Jan. 5, 1965   C. E. SCOTT   3,164,211
MACHINE FOR FORMING SOD ROLLS
Filed June 6, 1962   10 Sheets-Sheet 3
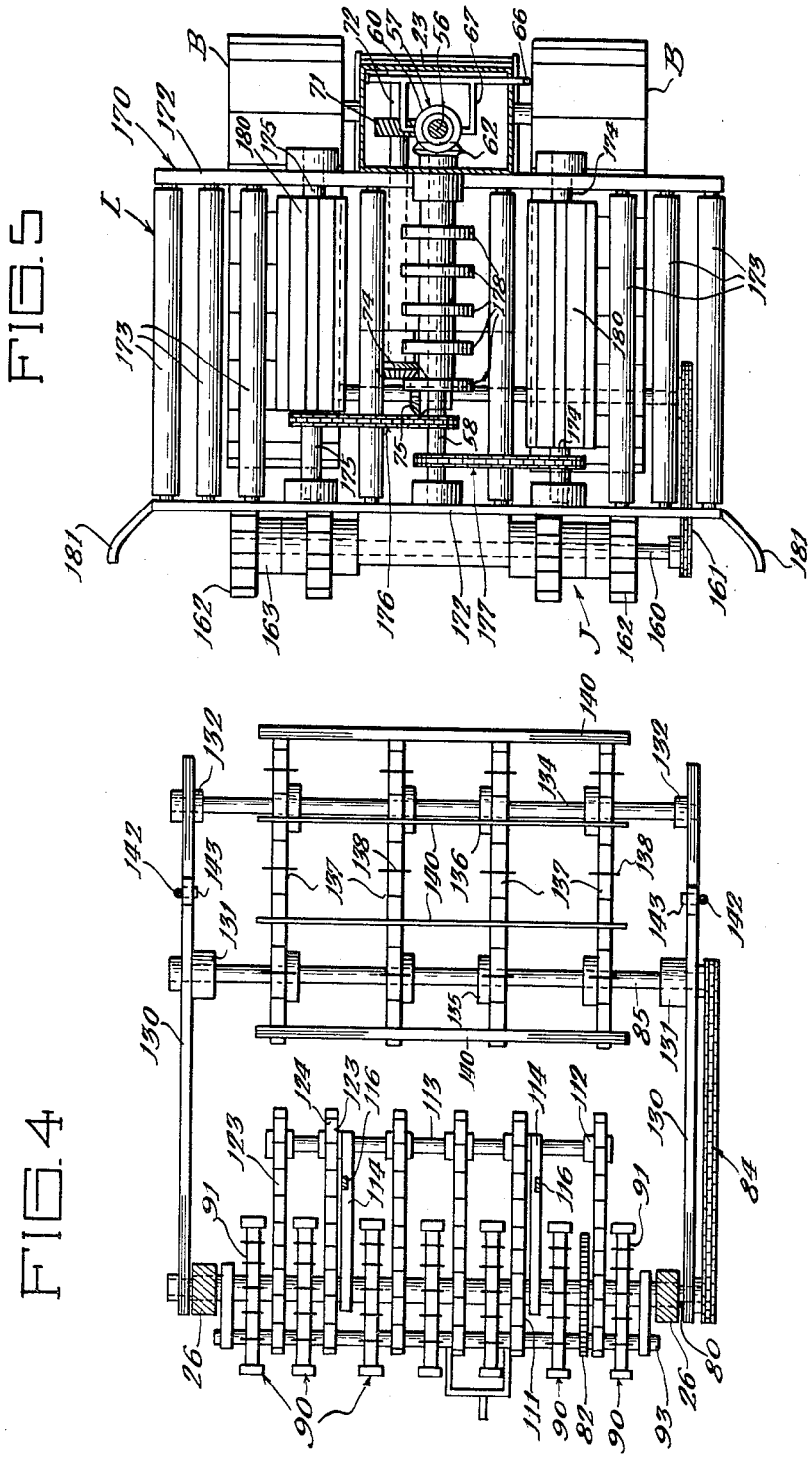

Jan. 5, 1965    C. E. SCOTT    3,164,211
MACHINE FOR FORMING SOD ROLLS
Filed June 6, 1962    10 Sheets-Sheet 4
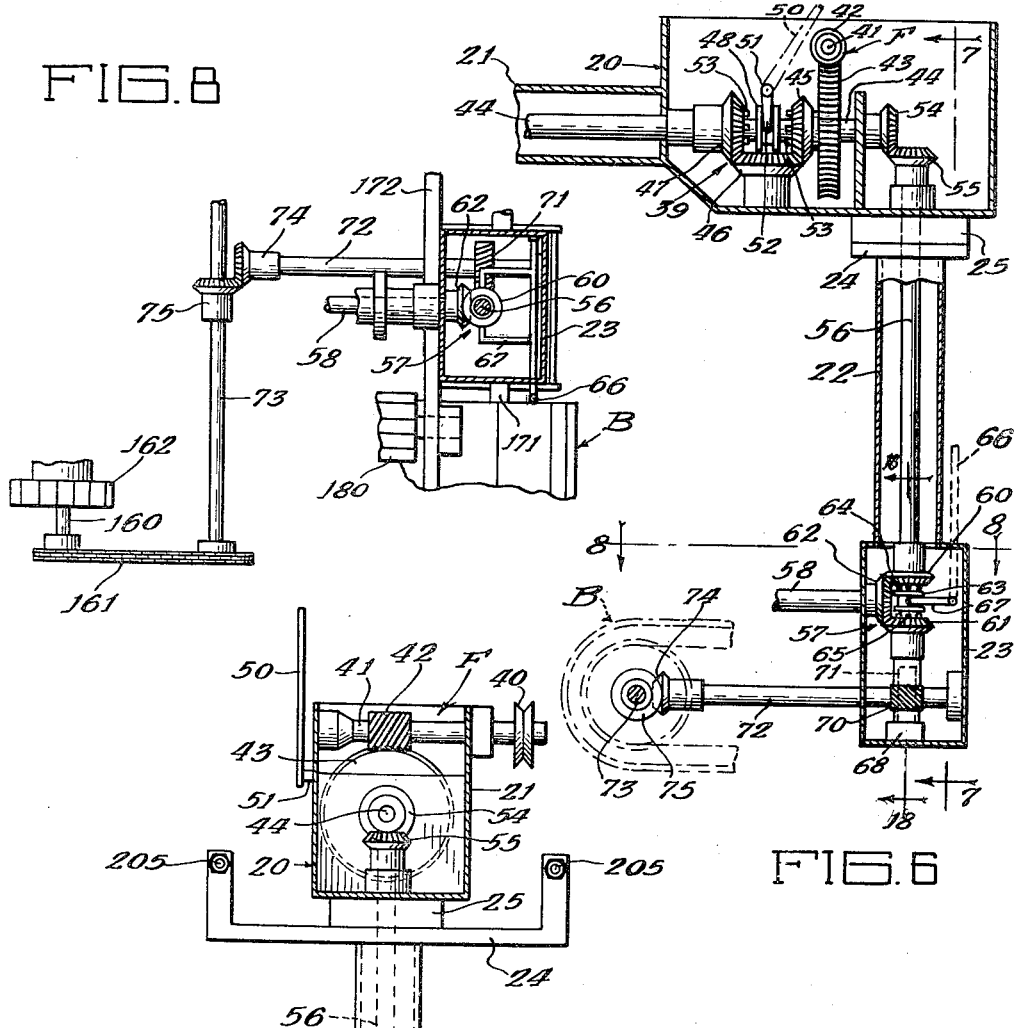
FIG.8
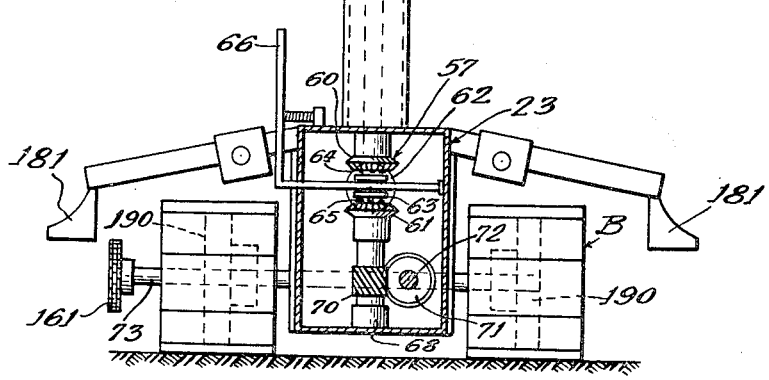
FIG.6
FIG.7

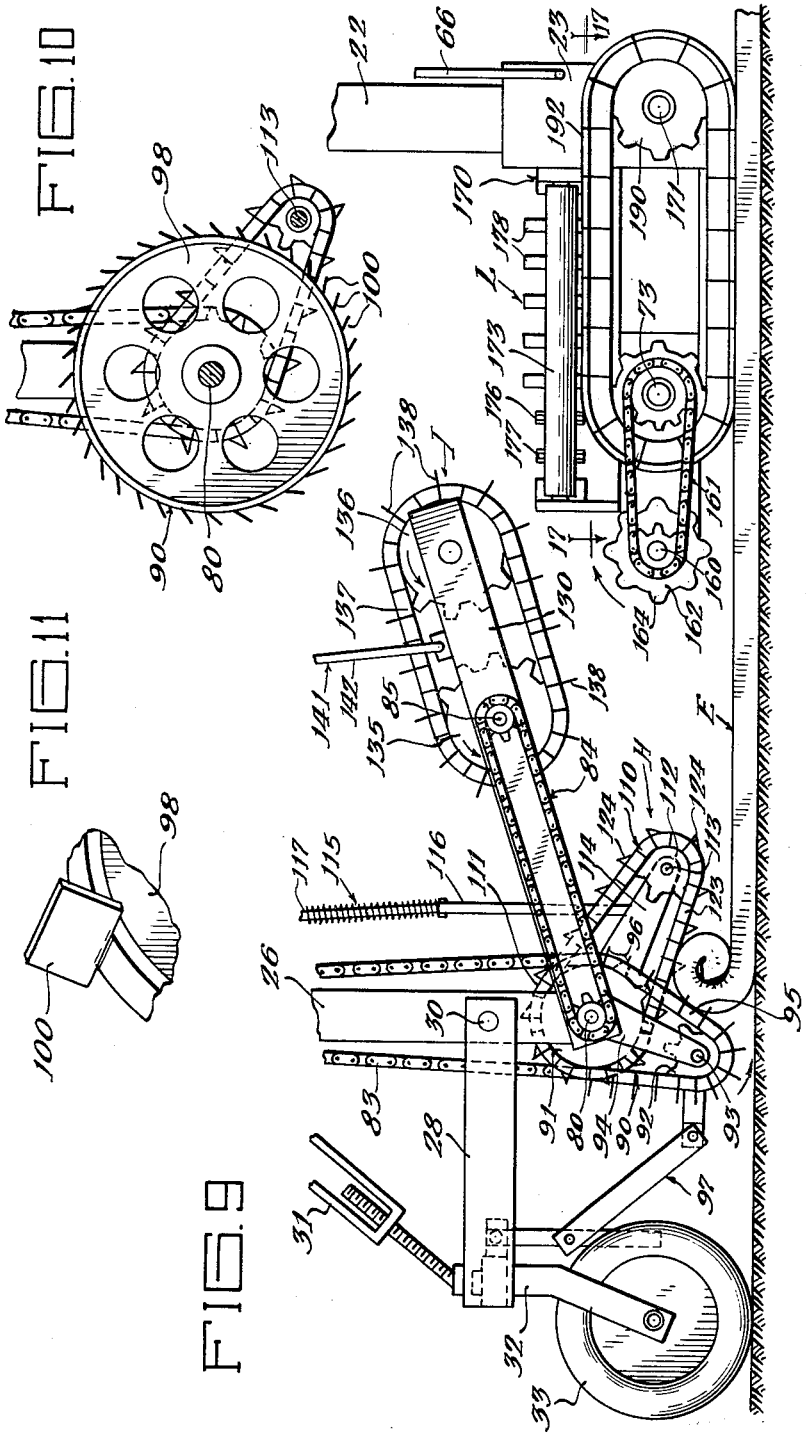

Jan. 5, 1965

C. E. SCOTT 3,164,211

MACHINE FOR FORMING SOD ROLLS

Filed June 6, 1962

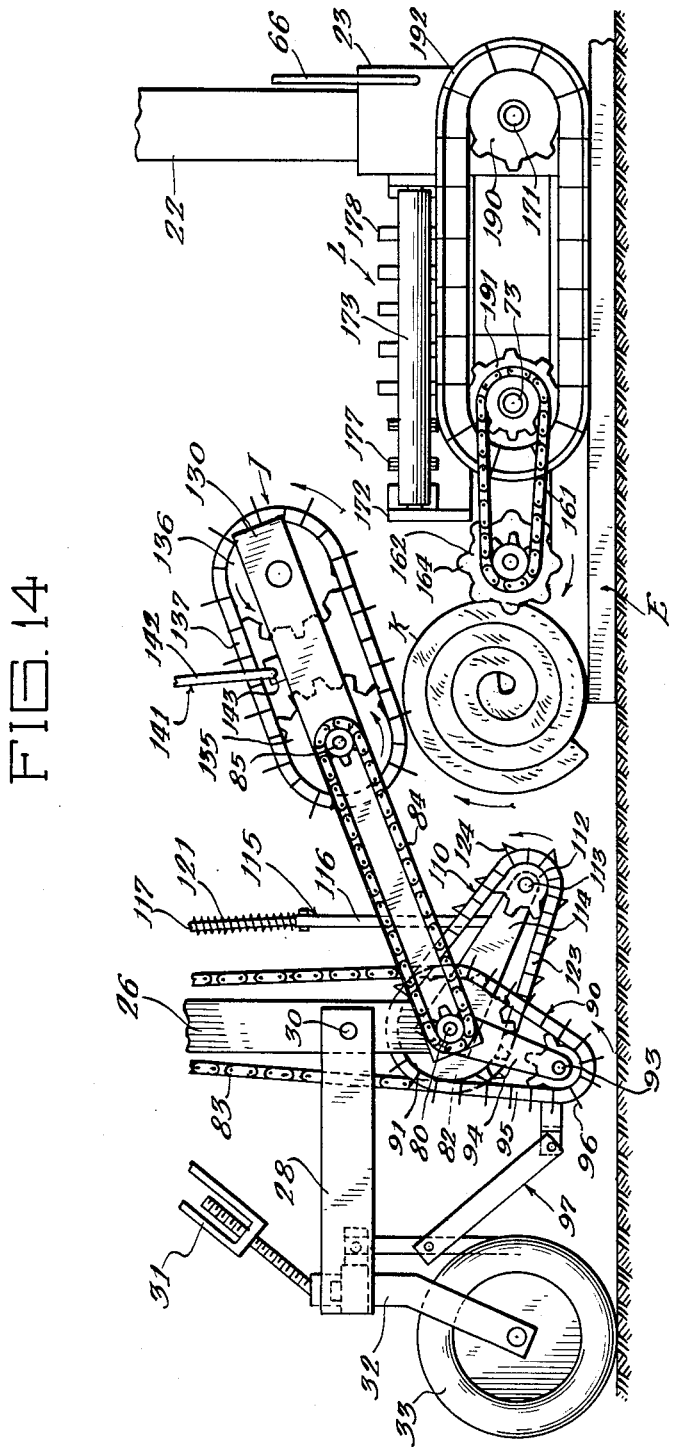

Jan. 5, 1965
C. E. SCOTT
3,164,211
MACHINE FOR FORMING SOD ROLLS
Filed June 6, 1962
10 Sheets-Sheet 8
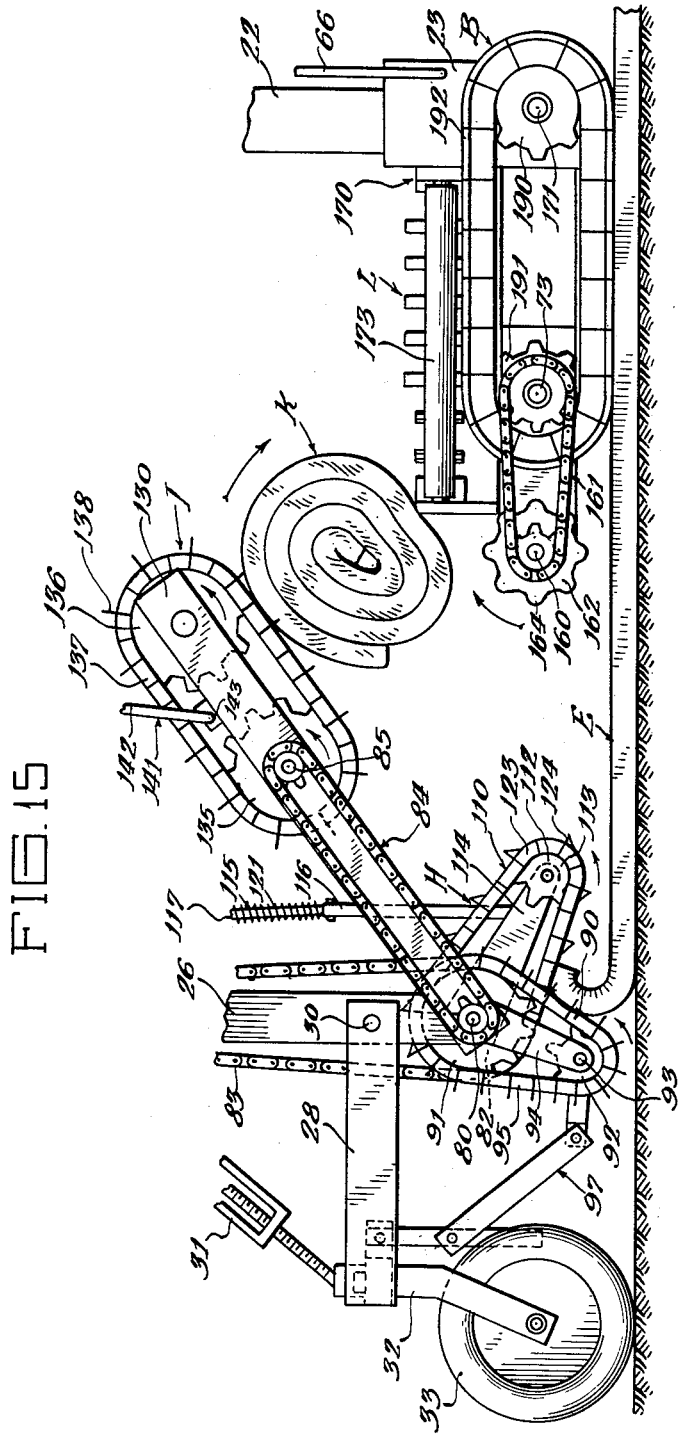

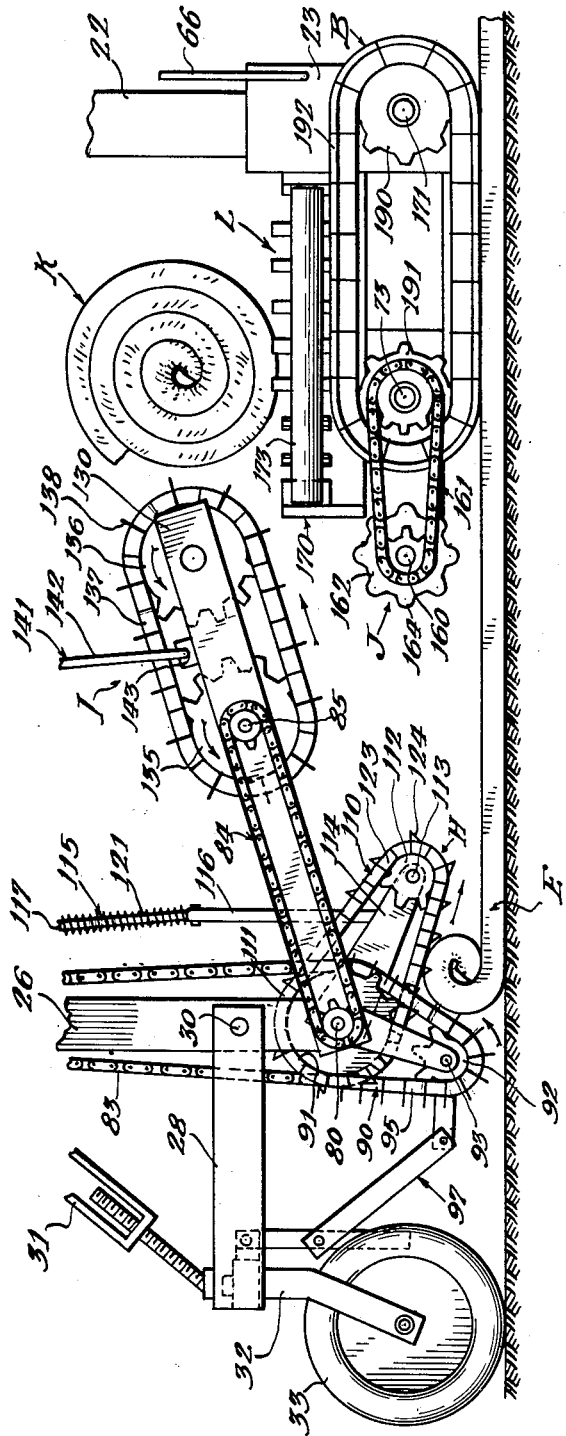

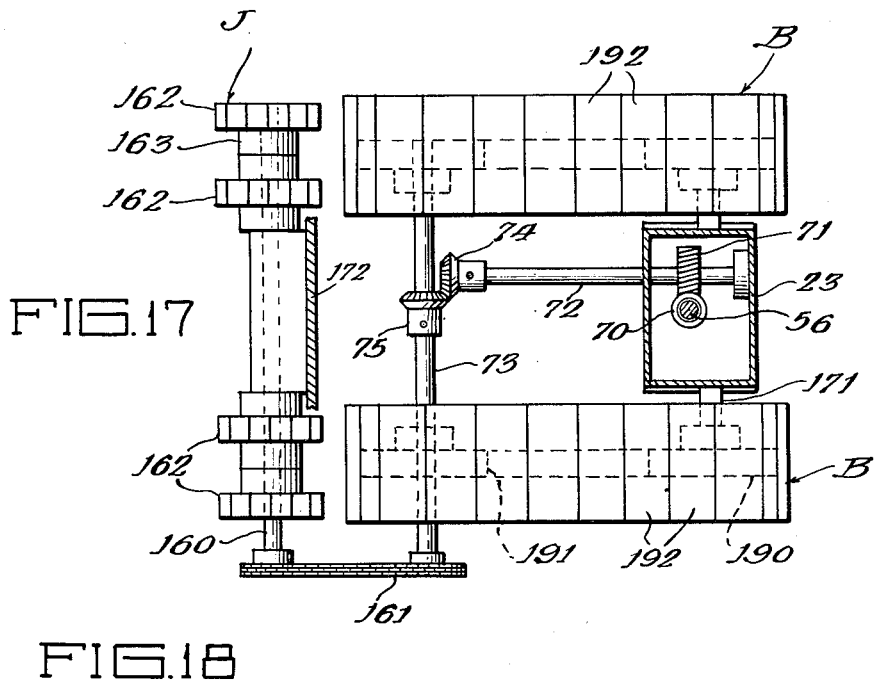
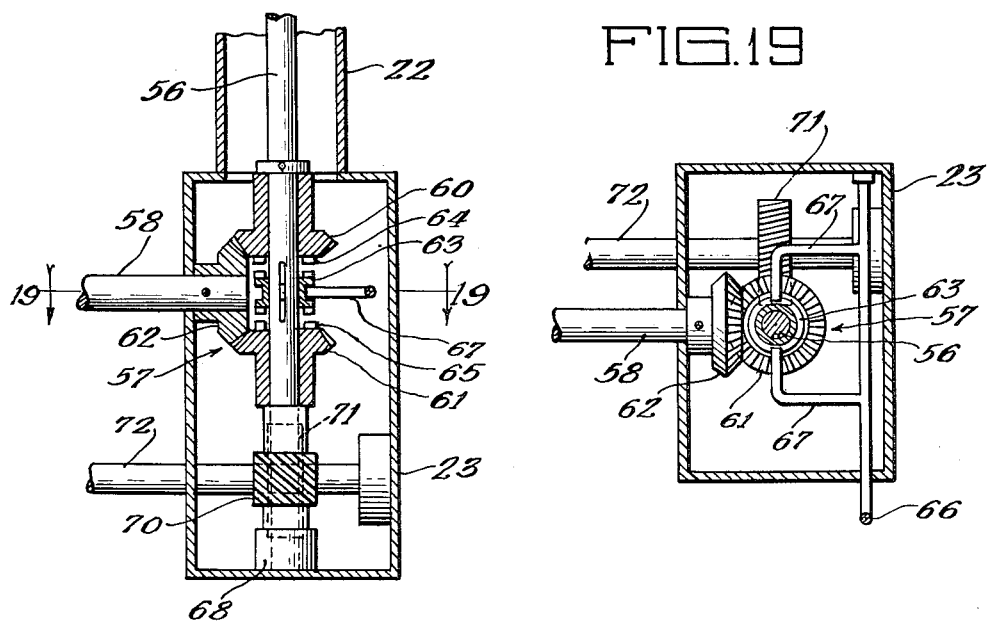

# United States Patent Office 3,164,211
Patented Jan. 5, 1965

3,164,211
MACHINE FOR FORMING SOD ROLLS
Chester Emerson Scott, Huntley, Ill., assignor to
Benedict O. Warren
Filed June 6, 1962, Ser. No. 200,535
13 Claims. (Cl. 172—19)

This invention relates to a device for forming sod rolls, and more particularly to a device adapted to form a length of sod on the ground into a sod roll by rolling the sod length in place and discharging the sod length laterally of the device.

In the past decade an increasing number of mechanisms have made their appearance on the market for cutting a field of sod into regularly formed sod lengths on the ground. These devices undercut the sod to a depth of about one inch to sever the sod from the earth, and then cross cut a strip of sod at regular intervals to provide uniform sod lengths. In the past there have been attempts to form the lengths of sod automatically into sod rolls by utilizing various types of machines. Certain of these sod roller machines have attempted to transport the lengths of sod upwardly off the ground and then to roll the individual sod lengths within the confines of the sod roller machine. Other of the sod roller devices have attempted to roll the sod in place upon the ground.

Thus far, none of the sod roller machines have met with commercial acceptance. One of the reasons is that the thickness of each sod length varies. Another of the reasons is that the consistency of different types of soil in each sod length vary a great deal. Still another reason is that the grass in each sod length varies in its individual capacity to retain the sod length integrally together. Because of the deficiencies in the previous sod rollers and because of their inability to adapt to sod in various soils, most of the sod even today is being manually rolled by individual workmen in the sod fields.

The mechanism of the present invention has for the first time overcome the deficiencies of prior sod roller mechanisms. The present structure adapts itself extremely well to all sod and soil conditions and affords a particularly unique mechanism which successively rolls individual sod lengths into sod rolls upon the ground and then deposits the sod rolls laterally of the sod roller mechanism so that the next successive sod length may likewise be rolled.

The primary object of the present invention is to provide a new and improved sod roller mechanism which will form a length of sod into a sod roll upon the ground.

Another object is to provide such a mechanism having a sod roll elevator and cross conveyor which cooperate to transport or move the formed sod roll laterally of the mechanism so that the mechanism is positioned to roll the next successive sod length.

A further object is to provide a unique drive means for such a mechanism, which drive means cooperatively actuates a sod pickup means, a sod rolling means and a sod elevating means.

A still further object is to provide a sod roller mechanism having a closely cooperating sod pickup means and sod roller means, the sod roller means being positioned to provide forwardly and downwardly moving portions to direct a forwardly inclined sod end into a tight central convolution of sod in each sod roll.

Still another object is to provide such a mechanism having a sod rolling means which is upwardly movable in a vertical plane to accomodate the increasing diameter of a sod roll during formation.

Yet another object is to provide a sod pickup means positioned laterally of the mechanism so as to provide a substantially continuous engagement with the free end of the sod length to be rolled.

The invention is illustrated in a preferred embodiment in the accompanying drawings in which:

FIGURE 4 is a section view taken along the line 4—4 of FIGURE 1 showing the sod pick-up means and sod rolling means and the auxiliary rolling means of the sod rolling machine of this invention;

FIGURE 5 is a section view taken along the line 5—5 of FIGURE 1 showing the sod roll elevating means and the sod roll conveyor of the sod rolling machine of this invention;

FIG. 6 is a fragmentary longitudinal sectional view of the front part of the supporting frame illustrating the drive gear train of the gear box which controls and imparts rotation to the rearwardly extending horizontal drive shaft, the front vertical drive shaft, the horizontal drive shaft of the side delivery means and the horizontal drive shaft for actuating the caterpillar treads;

FIG. 7 is a sectional view taken as indicated on line 7—7 of FIG. 6 and also showing the drive gear train for the sod roll forming machine;

FIG. 8 is a sectional view taken as indicated on line 8—8 of FIG. 6 with certain parts broken away for clarity of illustration to more clearly show the operation of the drive shaft for the side delivery means and the operation of the drive shaft for the caterpillar treads;

FIG. 9 is a fragmentary side elevational view of the lower portions of the sod roll forming machine, similar to the view of FIG. 1, and showing the initial stages of the sod roll forming operation and the cooperation between the sod pickup means and the sod rolling means;

FIG. 10 is a fragmentary elevational view of a modified form of sod pickup means which may be used in place of the pickup means shown in FIGS. 1 and 9;

FIG. 11 is an enlarged fragmentary perspective view of a portion of the periphery of one of the plurality of discs of the sod pickup means illustrated in FIG. 10;

FIG. 14 is a view similar to FIG. 9 showing a further stage of the sod roll forming operation in which the lower part and the upper part of the sod roll elevating means are beginning to take control of the formed sod roll to elevate the sod roll to the side delivery means;

FIG. 15 is a further view similar to FIG. 9 showing a completed sod roll being discharged upwardly onto the side sod delivery means and further showing the next successive sod length being engaged by the sod pickup means and the sod rolling means to start the formation of another sod roll upon the ground;

FIG. 16 is a further view similar to FIG. 9 showing the completed sod roll lodged upon the side delivery means for movement laterally of the machine and showing the next stage in starting the next successive sod roll to be formed as was earlier illustrated in FIG. 9;

FIG. 17 is a sectional view taken as indicated on line 17—17 of FIG. 9;

FIG. 18 is a sectional view taken as indicated on line 18—18 of FIG. 6; and

FIG. 19 is a sectional view taken as indicated on line 19—19 of FIG. 18.

Generally speaking, the sod roll forming device includes an upright frame A supported at its front end by laterally spaced caterpillar treads B and at its back end by laterally spaced caster wheels C. A steering mechanism D is provided for turning the caterpillar treads B so that the machine may be precisely directed over the cut lengths of sod E on the ground.

Within the frame A, and as best shown in FIGS. 6 and 7, is a drive means F formed from multiple gears and shafts which supplies power to the caterpillar treads B to move the sod roll forming machine over the ground. The drive means F also transfers driving power to a sod pickup means G and to a sod rolling means H which are positioned for mutual cooperation rearwardly of the frame A. In addition, the drive means F operates an auxiliary rolling means I and a sod elevating mechanism J which cooperate to lift a completed sod roll K (shown in FIG. 15) upwardly and forwardly onto a transverse conveyor H.

The operation of the pickup means G, the sod rolling means H–I and the sod elevating means J are regulated in timed relation to the speed of advancement of the sod roll forming machine over the ground; that is, the means G, H, I and J are timed so that the sod roll K, which is gradually being formed in convolutions, is also gradually advanced forwardly of the frame A as the sod roll forming machine is driven over the ground. This advancement of the sod roll K, and the positioning of the various cooperating sod roll forming means is so regulated that the completed sod roll K is ultimately discharged upon the transverse conveyor L in the position shown in FIG. 16.

The structure of the machine may be better understood by initially considering the drawings illustrating the various steps performed by the machine in a sod rolling operation. Thus for a general understanding of the operation, attention is invited to the successive stages of the sod rolling operation which are respectively illustrated in FIG. 1, FIG. 9, FIG. 12, FIG. 14, FIG. 15 and FIG. 16.

Special attention is directed to the initial stages of sod rolling, illustrated in FIGS. 1, 9, 15 and 16, and to the structure for providing a tight central convolution of sod upon which a sod rolling means may operate. In the present structure the sod pickup means G closely cooperates with the lower run of the rolling means H to direct the forwardly inclined sod end immediately downwardly upon a succeeding portion of the sod length to afford a tight and compact initial convolution which facilitates the rolling of the remainder of the sod roll.

The Frame

Figure 1:
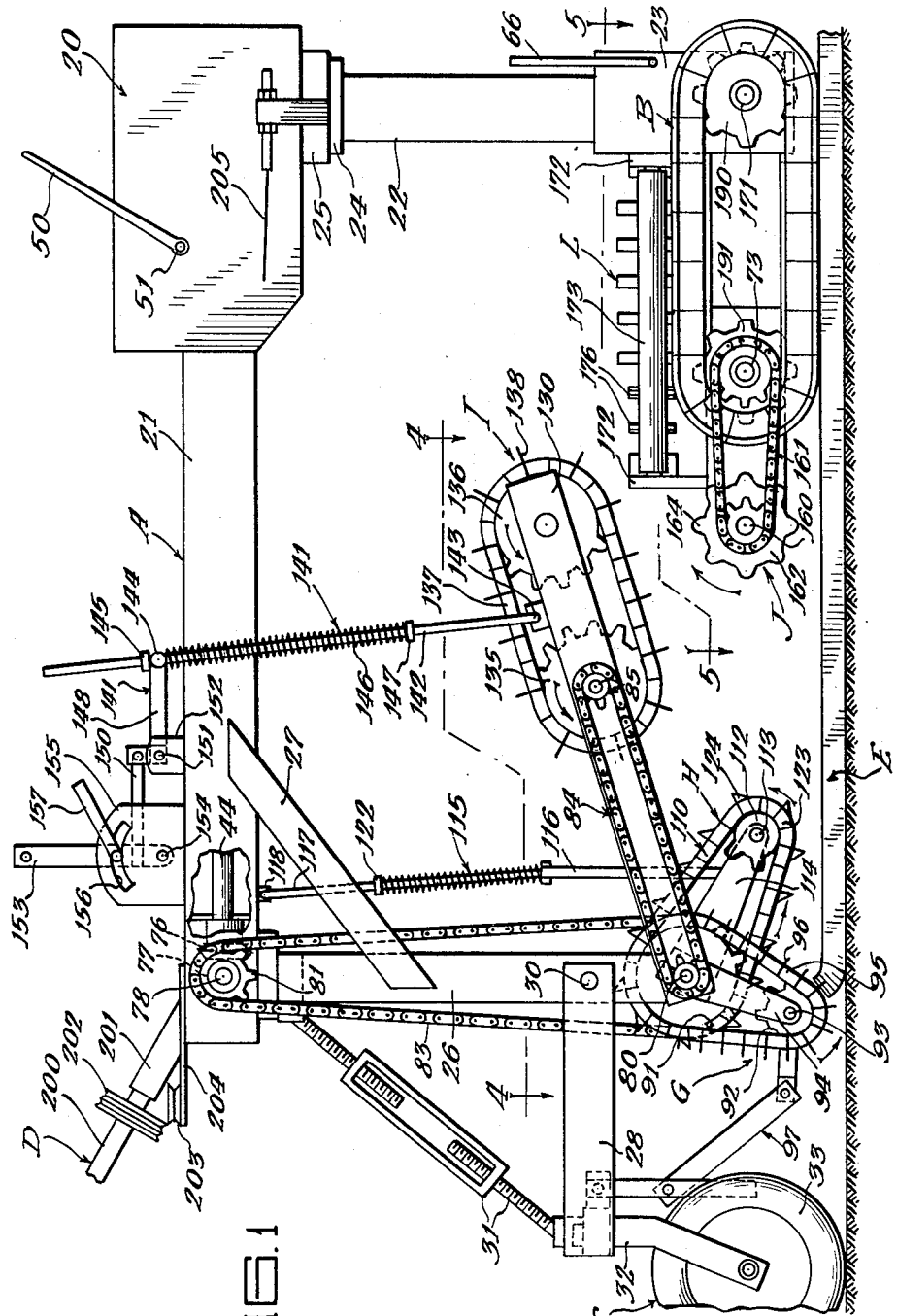
FIG. 1 is a side elevational view of the sod rolling machine with a portion of the horizontal driving shaft housing broken away to show the horizontal drive shaft.

As stated earlier, the sod rolling mechanism includes a supporting frame A which may be sustained at its front end by a pair of laterally spaced caterpillar treads B, and at its rear end, by laterally spaced caster wheels C. As best shown in FIGS. 1, 6 and 7, the frame A is provided with a main gear housing 20 and a rearwardly extending drive shaft housing 21 which afford a bridging structure joining the fore and aft portions of the mechanism.

The gear housing 20 is supported upon a vertical tubular housing 22 which accommodates the front vertical drive shaft of the device. At the lower end of the vertical housing 22 is a lower gear housing 23 in which the front portion of the caterpillar treads B are journalled. The vertical housing 22 and the lower gear housing 23 are fixedly secured together.

As best shown in FIG. 7, the upper end of the vertical housing 22 is also secured to a transverse guide bar 24 which bears on its upper face against a bearing block 25 secured to the main gear housing 20. As will be explained in greater detail later, the guide bar 24 is rotatable with respect to the bearing block 25 so that, when the guide bar 24 is turned, it carries with it the vertical housing 22, the lower gear housing 23 and the caterpillar treads B.

Steering of the mechanism is thus effected in this manner, and of course, it is contemplated that spaced wheels or other means of supporting the front end of the mechanism may be used in place of the caterpillar treads B.

Figure 2:
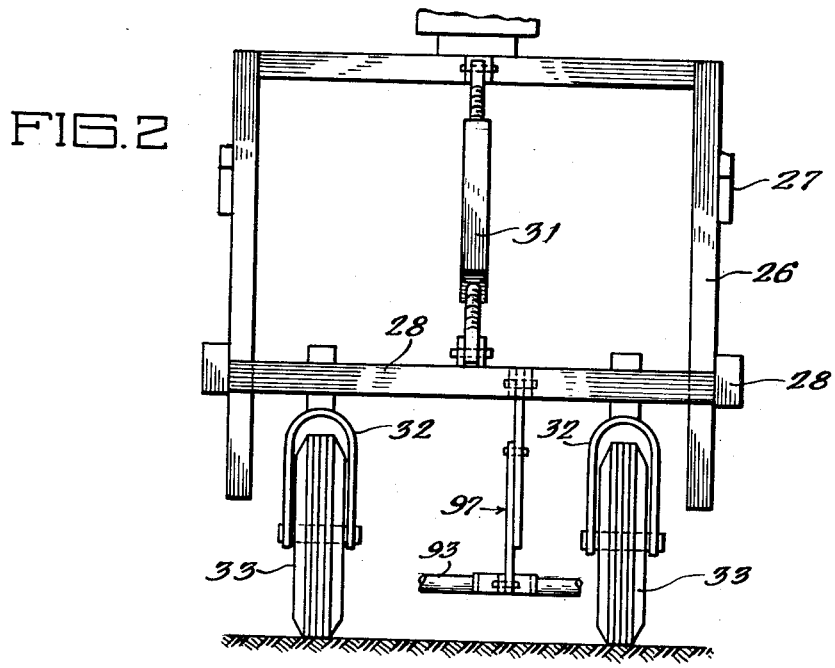
FIG. 2 is a fragmentary elevational view taken from the left of FIG. 1 and showing the rear support wheels and their U-shaped support member, front portions of the sod roll forming machine being omitted for clarity of illustration.
Figure 3:
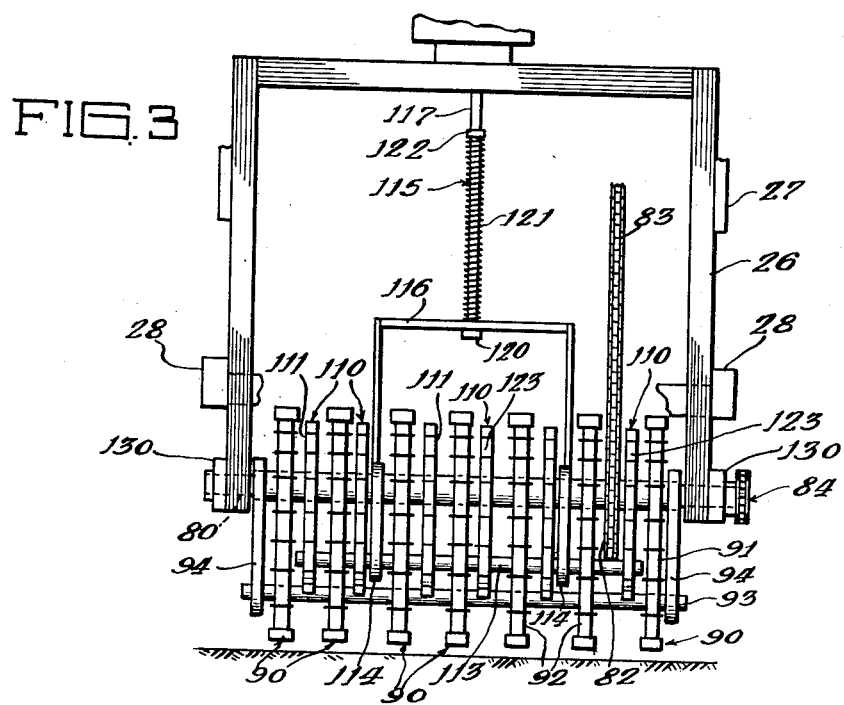
FIG. 3 is a fragmentary end elevational view taken from the left of FIG. 1 but omitting certain parts of the sod roll forming machine in order to clearly illustrate the structure of the sod pickup means and the sod rolling means.

As best shown in FIGS. 1, 2 and 3, a rear end of the horizontal housing 21 is supported by a rigid U-shaped frame 26 secured to the housing 21 and mounting the caster wheels C. Braces 27 may be added from each leg of the U-shaped frame 26 to provide additional rigidity. The lower ends of the U-shaped frame 26 are joined by a rearwardly extending U-shaped bracket 28. The angular adjustment of the bracket 28 may be controlled by loosening the nuts and bolts 30 on either side of the bracket 28 and by adjusting a turn buckle 31 which extends between the cross bar of the bracket 28 and the top of the U-shaped frame 26, as best shown in FIG. 2.

The cross bar of the bracket 28 also affords a convenient place for attachment for each of the laterally spaced bifurcated rotatable mountings 32 in which the wheels 33 are rotatably mounted. As best seen in FIG. 3, a lower end of the U-shaped frame 26 also affords bearing portions for the drive shaft for the sod pickup means G and sod rolling means H as will be more fully described later.

The Drive Means

As best seen in FIGS. 6, 7 and 8, a drive means is provided emanating from a single source of power. At the forward end of the device the drive means actautes caterpillar treads B, the transverse sod roll conveyor L and the sod roll elevating means J. At the rear end of the device the drive means actuates the sod pickup means G, the sod rolling means H, and the auxiliary rolling means I.

As best seen in FIG. 7, an exposed pulley 40 is shown which is shaped to accommodate an endless pulley belt leading from a source of power, such as a gasoline engine, not shown. The pulley 40 is fixed to a main transverse drive shaft 41 which is journalled in the main gear housing 20 and carries a worm gear 42 fixed thereto. The worm gear 42 intermeshes with a main drive gear 43 which is freely rotatable upon a horizontal drive shaft 44 and which concentrically carries a first bevel gear 45 secured thereto. The bevel gear 45 intermeshes with an upright idler bevel gear 46 which in turn intermeshes with a second idler bevel gear 47 positioned concentrically of the horizontal drive shaft 44. The second idler bevel gear 47 is freely rotatable upon the drive shaft 44 but is anchored within the housing 20 so as to be secured against movement longitudinally of the horizontal drive shaft 44.

This arrangement of the three bevel gears 45, 46 and 47 is conventional and affords a convenient clutch arrangement, generally designated 39, which controls the direction of rotation of the horizontal drive shaft 44. To this end, a slidable spool or clutch 48 is keyed to the horizontal drive shaft 44 so as to always rotate therewith. A lever 50 is pivoted at 51 to the gear housing 20, and has an inner end 52 which straddles the body of the spool or clutch 48. It will be noted that the opposed faces of the bevel gears 45 and 47 are each provided with a number of projections 53 which are of a size to be received within a number of corresponding recesses (not shown) in the annular ends of the spool or clutch 48.

In FIG. 6 the clutch 48 is shown in its neutral position, that is, out of engagement with the projections 53. By pivoting the clutch lever 50 in one direction, the clutch 48 can be brought into engagement with the projections 53 on bevel gear 45; by pivoting the lever in the opposite direction, the clutch 48 can be brought into engagement with the projections 53 on the bevel gear 47.

As explained above, when the clutch 48 is placed in engagement, it causes rotation of the horizontal drive shaft 44 which in turn rotates an end bevel gear 54 secured thereto. Bevel gear 54 is intermeshed with an upright bevel gear 55 secured to a vertical drive shaft 56 which is journalled at each of its opposite ends in the bottom of the gear housing 20 and in the top of the lower gear housing 23.

Within the lower gear housing 23 there is another clutch mechanism, generally designated 57, of similar construction to the clutch mechanism in the main gear housing 20. This clutch mechanism 57 controls the direction of rotation of a drive shaft 58 for the transverse conveyor L. The clutch mechanism 57 has an upper idler bevel gear 60 and a lower idler bevel gear 61 which concentrically embrace the vertical drive shaft 56 and are freely rotatable thereon. A third bevel gear 62 is secured to the drive shaft 58. A clutch or spool 63 is keyed to the drive shaft 56 for rotation therewith, but is slidable axially of the drive shaft 56 so that appropriately positioned recesses (not shown) in its opposite faces may be brought into engagement with either set of projections 64, 65 of the bevel gear 60, 61.

A pivoted hand lever 66 extends into the lower gear housing 23 and is provided with end portions 67 to slide the spool 63 upwardly or downwardly upon the vertical drive shaft 56. If the spool 63 is in engagement with the upper bevel gear 60, the drive shaft 58 is rotated in one direction; and if the spool 63 is in engagement with the lower bevel gear 61, then the drive shaft 58 is rotated in an opposite direction.

As best seen in FIG. 6, the vertical drive shaft 56 extends through the bevel gears 60 and 61 and is journalled in a thrust bearing 68 at the bottom of the gear housing 23. The lower end of the vertical drive shaft 56 has a worm gear 70 secured thereto. As best shown in FIGS. 7 and 8, the worm gear 70 intermeshes with a spur gear 71 secured to the caterpillar drive shaft 72. The drive shaft 72 in turn drives a cross shaft 73 through a pair of bevel gears 74 and 75 respectively secured to the shafts 72 and 73. The cross shaft 73 in turn drives the caterpillar treads B in a manner which will be described more fully later. It should also be noted that the cross shaft 73 is adapted to drive the sod roll elevating means J which also will be more fully described later.

Thus, it will be seen that the clutch mechanism in the main gear housing 20 controls the direction of rotation of the horizontal drive shaft 44 and thus the direction of rotation of the vertical drive shaft 56. The direction of rotation of the vertical drive shaft 56 in turn controls the direction of rotation of the caterpillar drive shaft 72 so that it can be seen that the clutch mechanism in the main gear housing in reality determines whether the caterpillar treads B will advance the mechanism over the ground or cause it to be moved in a rearward direction.

In summary, it will also be seen that the clutch mechanism, generally designated 57, in the lower gear housing 23 upon engagement predetermines the direction of rotation of the drive shaft 58 for the transverse conveyor L.

As best shown in FIGS. 1, 6 and 9, the horizontal drive shaft 44 transmits power to the sod pickup means G, to the sod rolling means H and to the auxiliary rolling means I. When the main clutch mechanism 39 in the gear housing 20 is in engagement to cause the caterpillar treads B to advance the device forwardly over the ground, the horizontal drive shaft 44 rotates in such manner as to cause the sod pickup means G, the sod rolling means H, and the rolling means I to move in the direction of the arrows as indicated in FIG. 1. At this time it will also be noted that the sod elevating means J is rotating as indicated by the arrows in FIGS. 1 and 9.

In FIGS. 1 and 6, it will be noted that the horizontal drive shaft 44 is journalled at each of its opposite ends in the main gear housing 20 and at the rear of the horizontal drive shaft housing 21. As best shown in FIG. 1, the rear end portion of the horizontal drive shaft 44 is provided with a bevel gear 76 which is positioned to intermesh with a second bevel gear 77 anchored to the upper rear cross shaft 78. This engagement is effected in the same manner as the engagement of the bevel gears 74 and 75 shown in FIG. 8.

The cross shaft 78 is rotatably mounted in the rear portion of the horizontal drive shaft housing 21, and it is adapted to drive a lower rear cross shaft 80 which is journalled in the lower ends of the U-shaped frame 26. To this end, an upper drive sprocket 81 is keyed to the cross shaft 78 and a lower drive sprocket 82 is keyed to the cross shaft 80. Drive chain 83 encircles the sprockets 81 and 82 to transmit power from the cross shaft 78 to the cross shaft 80. It is the cross shaft 80 which actuates the sod pickup means G and the sod rolling means H as will subsequently be described, and the cross shaft 80 through a chain and sprocket drive 84 actuates a drive shaft 85 of the auxiliary rolling means I.

*Sod Pickup Assembly*

The sod pickup means is shown herein in two forms. The preferred form is shown in all illustrations except for FIGS. 10 and 11 which show the modified form.

In the preferred form, and as best illustrated in FIGS. 1, 3 and 4, a number of sod engaging portions, generally designated 90, are spaced laterally of the cross shaft 80. The sod engaging portions 90 are preferably constructed and positioned so that each portion will simultaneously engage the exposed end of a sod length E substantially entirely across this exposed end. This insures that the sod engaging portions will carry the free end of the sod length E toward its initial convolution in a manner in which the exposed end is maintained in substantially a straight line relation. In other words, the exposed end will not take on an accentuated sinusoidal appearance.

Each of the sod engaging portions 90 is preferably of the chain and sprocket type and has an upper sprocket 91 (of substantially the same size as the lower drive sprocket 82) and a lower sprocket 92 preferably of smaller diameter. The upper sprocket 91 is keyed to the cross shaft 80 and rotates therewith, while the lower sprocket 92 is an idler sprocket mounted upon an idler shaft 93 which is held in spaced relation with respect to the cross shaft 80 by a pair of link arms 94 pivoted to the idler shaft 93 and to the cross shaft 80. Each corresponding pair of sprockets 91 and 92 has an encircling flexible chain 95 having a number of regularly spaced sod engaging plates 96 projecting outwardly thereof.

Means is provided in the preferred form for adjusting the position of the idler shaft 93 with respect to the surface of the ground. Thus, the engagement of the plates 96 with the free end of the sod length E is adjustable to provide optimum results under varying soil conditions. As herein shown, an adjustable linkage structure, generally designated 97, is provided which extends between the U-shaped bracket 28 (see FIG. 2) and the idler shaft 93 (see FIGS. 2 and 4). It is believed to be readily apparent that by loosening the appropriate bolts in the linkage structure 97, the idler shaft 93 can be swung downwardly or lifted upwardly by swinging on an arc governed by the link arms 94. When the proper height is effected, the linkage structure can simply be made rigid once more by tightening the bolts provided.

The modified form of sod pickup means is shown in FIGS. 10 and 11. A number of circular discs 98 are provided, and each disc is keyed to the cross shaft 80 for rotation therewith in the same manner as previously described in relation to the sod engaging portions 90. The circular discs 98 are each provided with a number of outwardly extending angular plates 100 which are adapted to engage the free end of a sod length to move it upwardly toward its initial convolution. Just as in the preferred embodiment, a number of the discs 98 are spaced laterally of the cross shaft 80 to insure a uniform advancement of the free edge of the sod length. When a sod roller device is employed using the discs 98, vertical adjustment of the discs 98 is effected by making provision for adjustment of the caster wheels 33.

While the discs 98 are capable of performing the sod pickup function, it is preferred to use the sod engaging portions 90. It is believed that the reason the portions 90 perform in a superior manner is because the plate 96 engaging the sod are moving on a smaller radius at the lower end than are the plates 100 on the circular discs 98; and that the straight forward run of the chains more gradually bends and lifts the sod end toward its forward inclined position. The longer arc of the discs 98 under some conditions of operation have a tendency to push the sod end rather than to pick it up and bend the sod end toward its initial convolution. Accordingly, the portions 90 have been found to more uniformly provide the important initial compact convolution of sod under varying conditions of soil and sod thickness and texture.

Sod Rolling Assembly

The sod rolling means H and auxiliary rolling means I can best be seen in FIGS. 3, 4 and 9. Sod rolling means H preferably includes a number of chain and sprocket structures, generally designated 110, each of which is spaced laterally of the lower cross shaft 80 between adjacent pairs of sod engaging portions 90. The structures 110 each include a large sprocket 111 substantially the same size as the lower drive sprocket 82 and a small sprocket 112 freely rotatable on a transverse bar 113 which is held in spaced relation from the cross shaft 80 by a pair of arms 114. The arms 114 each rotatably embraces the cross shaft 80 and the transverse bar 113 so that the structures 110 are freely pivotable about cross shaft 80 in a vertical plane.

A suspension member, generally designated 115, is provided for supporting the structures 110 the proper distance from the ground, as best seen in FIGS. 1 and 3. The suspension member 115 includes a yoke 116 formed from a pair of spaced side bars joined by a bridge which is rotatable in the upper ends of the side bars. The lower ends of each of the side bars are rigidly secured to one of the arms 114. The bridge of the yoke 116 is in turn secured to a rod 117 which is pivoted at one end at 118 to the underside of the housing 21. The other end of the rod 117 impales or penetrates the bridge of the yoke 116 and is threaded to accommodate a nut 120 (see FIG. 3). A coiled compression spring 121 embraces the rod 117 and bears at its opposite ends between the bridge of the yoke 116 and an adjustable stop 122 on the rod 117.

Each of the structures 110 is provided with an endless chain 123 which encircles sprockets 111 and 112. Each of the endless chains is preferably provided with a number of uniformly spaced pointed projections 124 extending outwardly of the chain 123 so as to engage and direct the free end of a sod length into a tight initial convolution as illustrated in FIGS. 9, 15 and 16.

Figure 12:
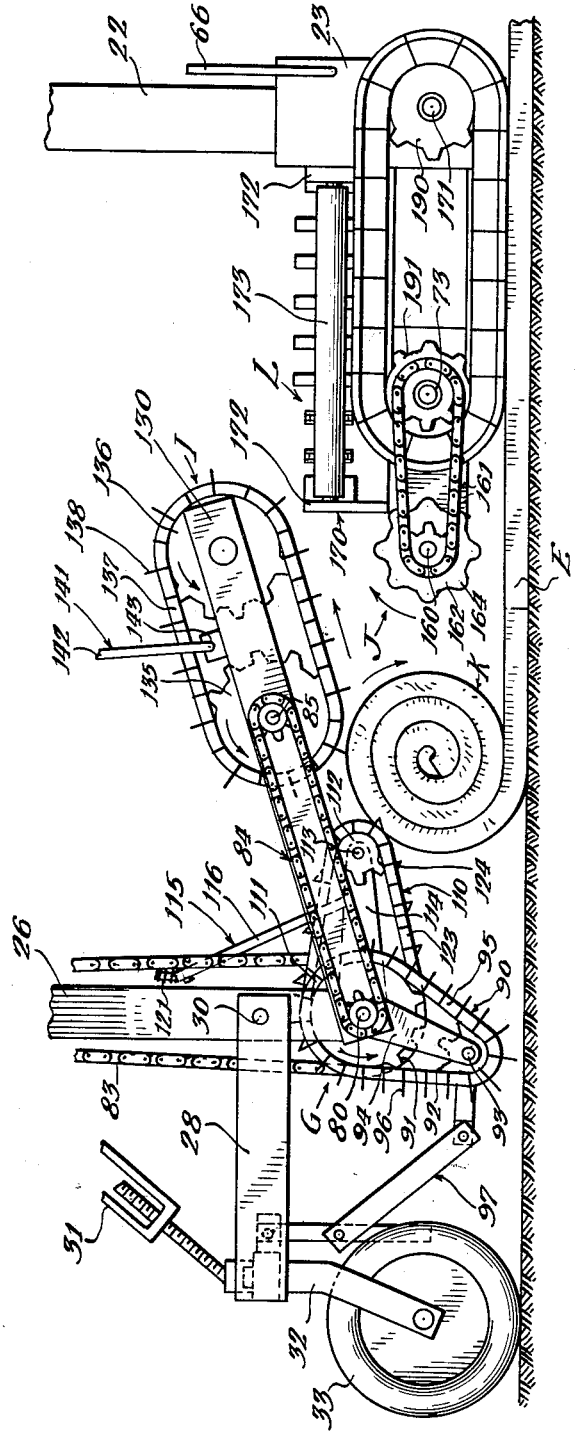
FIG. 12 is a view similar to FIG. 9 and showing an advanced stage of the sod roll forming operation in which the sod rolling means has advanced the sod roll forwardly under the machine so that the sod roll is being engaged by the top part of the sod roll elevating means.

As stated earlier, when the caterpillar treads are advancing forwardly over the ground, the horizontal drive shaft 44 is turning in a direction to impart movement to the chains 95 and 123 in the direction of the arrows illustrated in FIG. 1. Thus, in FIG. 1 the free end of the sod length is shown being lifted from the ground to a forwardly inclined position by the plates 96 of the chain 95. In FIG. 9, the projections 124 of the chains 123 are shown engaging and directing the sod length end downwardly and forwardly by rolling engagement on the forward side of the initial convolution to assure a tight and compact center turn in the sod roll. After the initial convolution is properly formed, the chains 123 continue to roll the sod length, and the speed of the chains is such to pass the sod length forwardly of the machine as shown in FIG. 12. As the sod roll grows in size, the structures 110 are pivoted upwardly against the action of the suspension member 115 (see FIG. 12), and the suspension member 115 exerts a knee action movement between the yoke 116 and the rod 117 to permit this upward swinging of the structures 110. In addition, since the rod 117 impales and passes through the bridge of the yoke 116 as the member 115 is swung upwardly, the spring 121 is gradually compressed to exert a resilient yielding action upon the structures 110. As the structures 110 are pivoted gradually upwardly, the chains 123 and projections 124 exert their rolling action in a rearwardly receding arc on the top of the growing sod roll.

Figure 13:
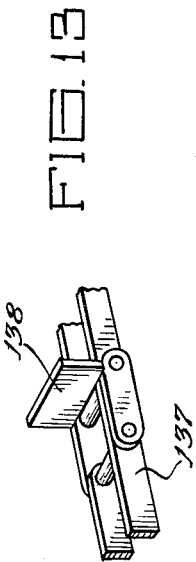
FIG. 13 is a fragmentary enlarged perspective view illustrating the outwardly projecting plates which are present on both the sod pickup means and the sod elevating means.

In FIG. 12, the growing sod roll is shown being passed along from the sod rolling means H to the auxiliary rolling means I. As best shown in FIGS. 1 and 4, the auxiliary rolling means includes a pair of supporting bars 130 each freely pivoted at one end about the ends of the lower rear cross shaft 80. The forward ends of the supporting bars 130 are provided with bearings 131, 132 which rotatably receive the spaced shafts 85, 134. Each of the shafts 85, 134 is provided with sprocket wheels 135, 136 pairs of which are longitudinally aligned to receive encircling chains 137. The chains 137 each have individual metal tabs 138 (see FIG. 13), and the chains may be joined by a number of uniformly spaced cross bars 140 projecting outwardly for contact with the sod roll being formed.

As stated earlier, the chain and sprocket drive 84 rotatably drives the shaft 85 in a direction indicated by the arrow in FIGS. 1 and 9 when the sod roller device is being advanced over the ground. The ratio between the speed of the sod roller device and the peripheral speed of the chains 137 is preferably adjusted so that the peripheral chain speed is approximately 1½ times the speed with which the device moves over the ground. The same thing is approximately true with respect to the speed of the chains 95 and 123. Thus, each sod roll is advanced forwardly of the device as the device is moved over the ground.

As best shown in FIG. 1, adjustable means are provided for yieldably retaining the auxiliary rolling means I a proper and appropriate distance off the ground. To this end, an adjustable support, generally designated 141, is provided. The support 141 includes a pair of rods 142 each pivotally secured at 143 to a supporting bar 130. As shown in FIG. 1, the rods 142 pass through and are loosely received in the opposite ends of a cross rod 144. The threaded free ends of each of the rods 142 is provided with a nut 145 which bears on the upper side of the cross rod 144 to predetermine the lowest angular position of the rolling means I. A coiled compression spring 146 embraces each of the rods 142 and bears between an adjustable stop 147 and the undersurface of the cross rod 144.

Thus, when the sod roll K is being built up as shown in FIGS. 12, 14 and 15, the auxiliary rolling means I is swung upwardly forcing the rods 142 upwardly through the cross rod 144 to compress each of the compression springs 146. As seen in FIG. 16, when the sod roll K is delivered to the transverse conveyor L, the rolling means I is free to swing downwardly under the influence of gravity and of the compression springs 146 to reassume the position shown in FIG. 16 preparatory to acting upon the next sod roll to be formed.

On the top side of the housing 21 is provided the fine adjustment for the adjustable support 141. As best shown in FIG. 1, a bell crank 148 is pivoted at one end to the cross rod 144 and at its other end to a link 150 with the corner of the bell crank 148 being pivoted at 151 to an upright extension 152. The link 150 is in turn pivotally secured to a handle 153 which in turn is pivoted at 154 to an enlarged extension 155. The extension 155 has an arcuate slot 156 therein and a threaded L-shaped member 157 is adapted to pass through the slot 156 and be threadably received in the handle 153 so as to adjustably position the handle 153 in any one of a number of positions with respect to the arcuate slot 156. By moving the handle 153 clockwise as shown in FIG. 1, the rolling means I would be lowered toward the sod roll elevating means J. By rotating the handle 153 counterclockwise, the rolling means I would be raised.

Sod Roll Elevating Means

Turning next to the sod roll elevating means J and referring particularly to FIGS. 5, 8, 14 and 17, mechanism is provided for cooperatively co-acting with the auxiliary rolling means I to raise the sod roll K upwardly out of the path of the trailing portions of the sod roller device and on to the transverse conveyor L. As best seen in FIGS. 5 and 8, a cross shaft 160 is rotatably journalled immediately beneath and rearwardly of the conveyor L. The cross shaft 160 is operatively connected to the driven cross shaft 73 by a chain and sprocket drive 161. A number of rotatable members 162 are secured to the cross shaft 160 and are spaced laterally of the device between spacer members 163, as shown in FIG. 5. The periphery of each of the rotatable members 162 preferably contains a number of regularly spaced nodes 164, as shown in FIG. 14. When the sod roller device is being advanced across the ground, the drive means for the device is such that the rotatable members 162 are moved in a direction as indicated by the arrow in FIG. 14.

In FIG. 12 the sod roll K is shown in the process of formation and is being advanced toward the laterally spaced rotatable members 162. In FIG. 14, the sod roll is shown completely formed. The sod roll has urged the auxiliary rolling means I upwardly, and it has become engaged by the peripheral nodes 164 of the rotatable members which cooperate with the encircling chains 137 and cross bars 140 to carry the sod roll upwardly (see FIG. 15) to a position on the side delivery means L (see FIG. 16). Sod is preferably cut in strips six feet long. The positions of the parts of the sod rolling machine and the speed of movement of the members contacting the sod roll during its formation are preferably regulated herein so that the sod roll K is deposited upon the transverse conveyor L in the position shown in FIG. 16. That is, the exposed end portion of the sod overlaps the top crown of the sod roll to better hold the sod roll together pending its sidewise removal from the machine.

The Transverse Conveyor

The transverse conveyor L is adapted to receive each successive sod roll K from the sod roll elevating means and functions to move each sod roll transversely of the front of the sod roller device so that the sod roll falls to the ground at the side of the device. As best shown in FIGS. 5, 6 and 16, the conveyor L includes a rigid frame, generally designated 170, which is secured at one end to the lower gear housing 23 and rests at its rearward side along the cross shaft or axle 73. Since the gear housing 23 is supported upon the front axle 171 of the caterpillar treads B, it could be said that the conveyor means L is supported by the front axle 171 and the rear axle 73. The frame 170 includes front and rear side bars 172 between which a number of idler rollers 173 are journalled.

Also, a number of driven members extend between the side bars 172 which driven members are capable of selectively delivering each sod roll K to a predetermined side of the sod roller device. For example, as best shown in FIGS. 5 and 6, the drive shaft 58 extends between the side bars 172 and is journalled therein. The drive shaft 58 also makes a driving connection with shafts 174 and 175 (see FIG. 5) each of which also extends between the side bars 172 and is rotatably journalled therein. As herein shown, this driving connection from drive shaft 58 to shafts 174 and 175 is provided by chain and sprocket drives 176 and 177.

The drive shaft 58 preferably has a number of raised rotatable portions 178 secured thereto and each of the shafts 174 and 175 has a raised roller 180 with an irregular periphery to engage a sod roll deposited on the conveyor L. Thus, when the clutch mechanism 57 is placed in engagement in the gear housing 23, the drive shaft 58 may be caused to rotate in either one of its two directions, and the rotatable portions 178 and the raised rollers 180 propel the sod roll K transversely of the device.

As best shown in FIG. 7, it can be seen that opposite sides of the frame 170 are inclined downwardly to facilitate the movement of the sod roll off the device. It can also be seen in FIGS. 5 and 7 that the rear side bar 172 is provided at its opposite end portions with a trailing deflector 181 which will engage the sod roll and move it further away from the device.

Steering Mechanism

As stated earlier, the front end of the sod roller device supported upon spaced caterpillar treads B which are swingable horizontally with the vertical tubular housing 22 to provide direction to the device. As herein shown, the steering mechanism D is operably connected to the vertical tubular housing 22 to effect guiding of the device.

The caterpillar support B includes a pair of supporting sprockets 190 one fixed to each of the outlet ends of the front axle 171 which is journalled in the lower gear housing 23. It also includes a pair of rear supporting sprockets 191 one fixed to each of the opposite ends of the rear axle 73 which is journalled in depending portions of the rigid frame 170 (not shown). Link tracks 192 encircle corresponding pairs of sprockets 190 and 191 to support the front end of the device and to provide traction when the device is moved forwardly over the ground.

The steering mechanism D includes a steering column 200 rotatably received in a rigid bearing 201 positioned on the top side of the rear end of the housing 21. A steering wheel (not shown) is normally positioned on the free end of the column 200. A dual pulley 202 is secured to the lower end of the steering column 200.

A pair of freely rotatable pulleys 203 are each positioned horizontally on an extension bar 204, the bars being rigidly secured to the upper side of the housing 21 and being spaced laterally thereof on opposite sides of the bearing 201. As best seen in FIGS. 1 and 7, the continuous flexible cord or wire 205 is secured at each of its opposite ends to the opposite ends of the transverse guide bar 24, and the wire 204 extends rearwardly of the device about the grooved periphery of the pulleys 203 and makes a plurality of convolutions about the dual or twin pulley 202 which is secured to a steering column 200. Thus when the column 200 is rotated, the wire 204 pulls on one or the other of the arms of the transverse guide bar 24 to rotate the vertical tubular housing 22 to which it is secured and to angularly turn the front axle 171 which is journalled in the lower gear housing 23 at the lower end of the vertical tubular housing 22.

Operation

In order to operate the sod roller mechanism, the main clutch mechanism 39 is first placed in a neutral position as shown in FIG. 6 and the motor (not shown) is actuated to rotate the main drive gear 43 and its bevel gear 45 secured thereto. The spool 48 is then thrown into engagement with one of the adjacent bevel gears to impart a forward driving movement to the supporting sprockets 191 of the caterpillar tread. The clutch mechanism 57 is also thrown into engagement to rotate the portions 178 and the rollers 180 in the desired direction.

As stated earlier, when the device is moving forwardly, the horizontal drive shaft 44 is turning so as to move the chain 95 and plates 96 of the sod pickup means in the direction indicated by the arrows in FIG. 1. At this same time, the endless chain 123 and its pointed projections 124 are also moving in the direction of the arrows in FIG. 1 as are the encircling chains 137 and cross bars 140 of the sod roll elevating means.

The transversely spaced sod engaging portions 90 (see FIG. 3) then engage the free end of the sod length E substantially across its entire width in the manner shown in FIG. 1. The free end is then carried upwardly and forwardly, as shown in FIG. 15, into engagement with the forwardly and downwardly moving portions of the endless chain 123 which tucks the free end of the sod length tightly back upon itself, as illustrated in FIG. 9. At this time it should be noted that the chain 123 is actually rolling on the forward side of the initial convolution. This has been found to be very desirable in providing a tight initial convolution.

After the first tight convolution of sod is provided, rolling action is exerted thereon to afford succeeding convolutions. The central initial turn must be compact in order for subsequent rolling to be effectively carried out. If the initial turn is loose, the succeeding portions of the sod length have no compact central core to bear against under pressure from the rolling chains 123.

Since the speed of the chains is greater than the linear speed of the device moving over the ground, the sod roll is advanced forwardly of the machine as shown in FIG. 12. The chain and sprocket structures 110 are free to swing upwardly as the sod roll increases in size and auxiliary rolling means I is likewise free to swing upwardly to accommodate the gradually increasing size of the sod roll. These upward swinging movements are illustrated in FIG. 12.

FIG. 14 illustrates the start of the removal of the completed sod roll K from the path of the machine. The sod roll K is engaged by the rotatable members 162 which together with the encircling chains 137 lift the sod roll forwardly to the transverse conveyor L. From the conveyor L the sod roll is moved sidewardly by the rotatable portions 178 and roller 180 until the sod roll falls onto the ground where it may be deflected further sidewardly by the deflector members 181.

The foregoing detailed description is given for clearness of understanding only and no unnecessary limitations should be understood therefrom, for some modifications will be obvious to those skilled in the art.

I claim:

1. In a machine having a frame adapted for forward movement over sod lengths on the ground, a sod rolling mechanism, comprising: sod pickup means mounted transversely of the frame and closely adjacent to the ground and having a plurality of peripherally disposed sod engaging portions movable in an upright plane, the movable sod engaging portions being directed upwardly when on the forward side of the sod pickup means to engage the free end of a sod length on the ground and to lift said free end from the ground and carry the same upwardly; and means on the frame extending transversely across the path of the upwardly moving sod engaging portions of the sod pickup means and being yieldably upwardly movable from an initial position, said means having a lower run of movable elements directed forwardly and downwardly when in said initial position to receive the upwardly turned free end of the sod length and to redirect said free end forwardly and downwardly toward the ground upon the remainder of the sod length on the ground to form a tight initial convolution in the sod length, the lower run of the movable elements continuing to engage the initial and subsequent convolutions and being gradually urged upwardly and forwardly as the frame moves forwardly over the sod lengths so that the sod length is formed into a sod roll having a plurality of convolutions.

2. A sod rolling mechanism as specified in claim 1, in which a second means is mounted on the frame forwardly of the lower run of movable elements, said second means being yieldably upwardly movable of the frame and having a lower run of forwardly movable members spaced laterally of the frame for contacting and rolling the sod roll forwardly of the frame.

3. A sod rolling mechanism as specified in claim 1, in which a second means is mounted on the frame forwardly of the lower run of movable elements, and a transverse conveyor is mounted on the frame forwardly of said second means, the second means being yieldably upwardly movable of the frame and having a lower run of forwardly movable members spaced laterally of the frame for contacting and rolling the sod roll onto the transverse conveyor to move successively formed sod rolls laterally of the frame.

4. A sod rolling mechanism as specified in claim 2, in which adjustable means are provided on the frame for regulating the height of each of the lower runs of movable elements.

5. In a machine having a frame adapted for forward movement over sod lengths on the ground, a sod rolling mechanism, comprising: sod pickup means mounted transversely of the frame and closely adjacent to the ground and having a plurality of laterally spaced, peripherally disposed sod engaging portions movable in an upright plane, the movable sod engaging portions being directed forwardly and upwardly when on the forward side of the sod pickup means to engage the free end of a sod length in laterally spaced portions so as to lift said free end from the ground and carry the same upwardly to a forwardly inclined position; and means on the frame extending transversely across the path of the forwardly and upwardly moving sod engaging portions of the sod pickup means and being yieldably swingable in an upright plane from an initial position, said means having a lower run of movable elements directed forwardly and downwardly when in said initial position and being positioned to receive the forwardly inclined free end of the sod length so as to redirect said free end forwardly and downwardly toward the ground upon the remainder of the sod length on the ground to form a tight initial convolution in the sod length, the movable elements continuing to engage the initial and subsequent convolutions and being gradually swung upwardly and forwardly as the frame moves forward over the sod lengths so that the sod length is formed into a sod roll having a plurality of convolutions.

6. In a machine having a frame adapted for forward movement over sod lengths on the ground, a sod rolling mechanism, comprising: an upper shaft and a lower shaft extending laterally of the frame; corresponding pairs of rotatable sprockets spaced laterally of each shaft; endless chains encircling each corresponding pair of sprockets, each chain having a plurality of peripherally disposed sod engaging portions to afford forwardly and upwardly directed forward chain runs for engaging the free end of a sod length on the ground in laterally spaced portions so as to lift said free end from the ground upwardly to a forwardly inclined position; a cross shaft mounted laterally of the frame forwardly of said lower shaft and being pivotally joined to said upper shaft for yieldable vertical swinging movement; second corresponding pairs of rotatable sprockets spaced laterally of the cross shaft and the upper shaft; the sprockets on the upper shaft of the second pair being positioned between sprockets thereon of the first pair; endless sod rolling chains encircling each second corresponding pair of sprockets, each chain including a plurality of peripherally disposed projections to afford a lower chain run extending forwardly and downwardly across the path of said forward chain runs when said lower chain runs are in initial position, said lower runs being positioned to receive the forwardly inclined free end of the sod length and to redirect said free end downwardly toward the ground upon the remainder of the sod length on the ground to form a tight initial convolution in the sod length, the projections of the lower runs continuing to engage the initial and subsequent convolutions and being gradually swung upwardly and forwardly as the frame moves forward over the sod lengths so that the sod length is formed into a sod roll having a plurality of convolutions; and drive means for rotating the sprockets.

7. A machine for forming a length of sod into a sod roll, comprising: a movable frame adapted to be directed forwardly over the length of sod on the ground; pickup means positioned transversely of the frame closely spaced from the ground for engaging the free end of the sod length on the ground and lifting said free end upwardly from the ground; and sod rolling means on the frame positioned forwardly of said pickup means, said sod rolling means having movable portions positioned for forward and downward movement when engaging the upwardly directed free end of the sod length and for rolling said free end downwardly toward the ground upon the remainder of the sod length on the ground to closely compact the initial convolution of the sod length, the movable portions continuing to engage the succeeding portions of the sod length as the frame moves forwardly thereover to roll the sod length into a sod roll having a plurality of convolutions.

8. A machine for forming a length of sod into a sod roll as specified in claim 7, in which the sod rolling means is movably mounted with respect to the frame and pickup means, whereby the movable portions are gradually urged upwardly of the frame by the sod roll from an initial position as the sod roll increases in size during a sod rolling operation.

9. A machine for forming a length of sod into a sod roll as specified in claim 7, in which the sod rolling means is movably mounted with respect to the frame and pickup means, the movable portions of the sod rolling means being advanced at a speed greater than the speed of the advancement of the frame so that the sod roll being formed is advanced forwardly of the frame and the movable portions are gradually urged upwardly of the frame by the sod roll as the sod roll increases in size during the sod rolling operation.

10. A machine for forming a length of sod into a sod roll as specified in claim 7 in which a sod elevating means is mounted on the frame forwardly of the sod rolling means and in which a transverse conveyor is mounted on the frame forwardly of the sod elevating means, said transverse conveyor being positioned to receive a formed sod roll from the sod rolling means and to deposit the sod roll laterally of the machine to enable the pickup means to initiate rolling of the next successive sod length.

11. A machine for forming a length of sod into a sod roll as specified in claim 7, in which the pickup means includes a plurality of discs journalled rearwardly of the frame and extending transversely thereof, the pickup means having peripherally spaced sod engaging projections for engaging the free end of the sod length on the ground and directing said free end upwardly to the sod rolling means.

12. A machine for forming a length of sod into a sod roll, comprising: a movable frame adapted to be directed forwardly over the length of sod on the ground; pickup means positioned transversely of the frame and closely spaced above the ground for engaging the free end of the sod length on the ground and lifting said free end upwardly; sod rolling means on the frame positioned forwardly of said pickup means, said sod rolling means having movable portions positioned for forward and downward movement when engaging the upwardly directed free end of the sod length and for rolling said free end forwardly and downwardly toward the ground upon the remainder of the sod length on the ground to closely compact the initial convolution of the sod length, the movable portions continuing to engage the succeeding portions of the sod length as the frame moves forwardly thereover to roll the sod length into a sod roll having a plurality of convolutions; a sod elevating means mounted on the frame forwardly of the sod rolling means; a transverse conveyor positioned on the frame forwardly of the sod elevating means to receive each successively completed sod roll and to discharge each sod roll laterally of the machine; and drive means for actuating the pickup means, the sod rolling means and the transverse conveyor.

13. A machine for forming a length of sod into a sod roll, comprising: a frame, a plurality of rotatable supports for supporting the frame off the ground and for guiding the frame over the length of sod on the ground; a drive shaft journalled transversely of the frame; a first idler shaft positioned below the drive shaft and transversely of the frame; a second idler shaft positioned transversely of the frame and forwardly of the drive shaft, the second idler shaft being swingable in an upright direction about the drive shaft; a plurality of pairs of rotatable sprockets similarly spaced transversely of the drive shaft and first idler shaft; endless sod engaging chains encircling corresponding pairs of said rotatable sprockets to form a series of laterally spaced forward chain runs for engaging the free end of the sod length on the ground and lifting said free end upwardly; second pairs of rotatable sprockets on said drive shaft and second idler shaft similarly spaced transversely of each of said shafts; endless sod rolling chains encircling corresponding pairs of sprockets on the drive shaft and second idler shaft to form a series of laterally spaced lower chain runs for engaging the outwardly directed free end of the sod length and for rolling said free end downwardly upon immediately succeeding portions of the sod length on the ground to closely compact the initial convolution of the sod length, the lower runs continuing to engage succeeding portions of the sod length to roll the sod length into a sod roll having a plurality of convolutions; a transverse carrier positioned on the frame forwardly of the upwardly swingable sod rolling chains; sod roll elevating means positioned between said carrier and said sod rolling chains and extending transversely of the frame, said sod elevating means having rearwardly exposed, upwardly moving elements for engaging a sod roll and lifting it forwardly onto the conveyor; and drive means for advancing the frame over the ground, said drive means being operatively connected to the drive shaft to rotate the sprockets.

References Cited in the file of this patent
UNITED STATES PATENTS

| | | |
|---|---|---|
| 703,470 | Rembert | July 1, 1902 |
| 2,756,661 | Frisbie et al. | July 31, 1956 |
| 2,778,292 | Kavan | Jan. 22, 1957 |
| 2,872,989 | Hadfield | Feb. 10, 1959 |
| 2,987,124 | Hadfield | June 6, 1961 |
| 3,051,251 | Golden | Aug. 28, 1962 |
| 3,053,328 | Geipel | Sept. 11, 1962 |